United States Patent
Ishihara et al.

[15] 3,645,525
[45] Feb. 29, 1972

[54] METHOD AND APPARATUS FOR PLACING BUFFER SHEET ALONG MOVING RIGID SHEET

[72] Inventors: Kazuo Ishihara, Nishinomiya-shi; Toyoo Segawa, Higashiosaka-shi; Hiroaki Zaita, Ichihara-shi, all of Japan

[73] Assignee: Nippon Sheet Glass Co., Ltd.

[22] Filed: Aug. 18, 1969

[21] Appl. No.: 850,968

[30] Foreign Application Priority Data

Aug. 22, 1968 Japan..............................43/60277
Aug. 23, 1968 Japan..............................43/60661
Oct. 2, 1968 Japan..............................43/86402

[52] U.S. Cl. ...........................................270/45, 11/3, 270/69
[51] Int. Cl. ........................................B42c 1/00, B42c 11/04
[58] Field of Search ....................270/45, 32, 37, 2, 4, 46, 47, 270/51, 52, 53, 57, 58, 69; 156/216, 477 B

[56] References Cited

UNITED STATES PATENTS

| | | | |
|---|---|---|---|
| 936,480 | 10/1909 | Sague.................................. | 270/45 X |
| 2,628,092 | 2/1953 | Malmros et al.......................... | 270/45 |
| 3,372,922 | 3/1968 | Snellman et al. ....................... | 270/58 |

FOREIGN PATENTS OR APPLICATIONS

| | | | |
|---|---|---|---|
| 651,545 | 10/1937 | Germany................................. | 270/32 |
| 53,682 | 2/1967 | Germany..................................... | 11/3 |

Primary Examiner—Robert W. Michell
Attorney—Wenderoth, Lind & Ponack

[57] ABSTRACT

A method of automatically placing a soft buffer sheet such as paper, fabrics, nonwoven fabrics and synthetic resin films along a moving rigid sheet, and an apparatus for practicing the method comprising a conveying passageway for transferring rigid sheets, a station for keeping a stack of the buffer sheets, a vacuum device applying a suction to; and transferring the buffer sheets, a feed device for feeding the buffer sheets, a device for interrupting the vacuum device, related apparatus for bending the projecting end of the buffer sheet over the surface of the rigid sheet, and apparatus for conveying the buffer sheet covered rigid sheets by the use of vacuum suction means to a station where they are successively vertically registered and stacked in predetermined numbers.

12 Claims, 8 Drawing Figures

Patented Feb. 29, 1972

KAZUO ISHIHARA,
TOYOO SEGAWA and
HIROAKI ZAITA,
INVENTOR.s

BY Wenderoth, Lind+Ponack

Attorneys

KAZUO ISHIHARA,
TOYOO SEGAWA and
HIROAKI ZAITA,
INVENTOR.s

BY Wenderoth, Lind & Ponack
Attorneys

METHOD AND APPARATUS FOR PLACING BUFFER SHEET ALONG MOVING RIGID SHEET

This invention relates to a method and an apparatus for placing a buffer sheet such as paper, fabrics, nonwoven fabrics and synthetic resin films along a moving rigid sheet.

When a stack of sheet material such as glass, metals or resins is packaged, it is a common practice to place paper between the sheets. Heretofore, the insertion of paper has been accomplished by personnel, who manually place a sheet of paper on each of the sheets during the stacking operation. The insertion of paper being entirely dependent upon manual labor, the overall packaging operation including the insertion of paper has been unable to be performed with good efficiency. This naturally has involved the necessity of employing a number of operators to perform the operation, and resulted in an increased cost of production.

An object of the present invention is to provide a method of accomplishing the packaging of sheets with good efficiency and an apparatus for use in achieving the method.

Another object of the invention is to provide a method of automatically placing a buffer sheet such as paper, fabrics, nonwoven fabrics and synthetic resin films along a rigid sheet while the rigid sheet is being transferred to a stacker, and an apparatus for practicing the method.

According to the method facet of the invention, a soft buffer sheet is placed along at least one surface of a moving rigid sheet so that one end of said buffer sheet projects from at least one side of a passageway for transfer of a rigid sheet material and across said passageway, moving said rigid sheet along said passageway toward the projecting end of said buffer sheet, holding said buffer sheet over both surfaces of said rigid sheet at a part which contacts the tip of said rigid sheet, and simultaneously withdrawing said rigid sheet and said associated buffer sheet as a unitary body. The invention also provides a method of transferring rigid sheets and overlaid soft buffer sheets placed along at least one surface of said rigid sheets, stacking them and further transferring them, which comprises transferring said rigid sheets and the associated buffer sheets, dropping them preferably in an oblique direction to the transfer passageway so that one end of the rigid sheet having the folded-over portion of the buffer sheet is directed downwards, receiving the dropped rigid sheets with associated buffer sheets, registering and stacking them, and transferring a stack of these sheets when a predetermined number of said rigid sheets and buffer sheets have been stacked.

Another facet of the invention provides an apparatus for placing a soft buffer sheet along at least one surface of a moving rigid sheet, which apparatus comprises a conveying passageway for transferring rigid sheets continuously in a generally horizontal direction; a station for supplying a stack of soft buffer sheets; means located adjacent said station and having a surface for applying a vacuum to effect transferring said buffer sheets, which surface is provided vertically of said transfer passageway, said means being adapted to transfer said buffer sheets in a direction transverse to said passageway; a feed device for feeding the buffer sheets one by one from the station to the vacuum transferring surface of said means; a device for stopping or interrupting said means for positioning said buffer sheets so that one end of said buffer sheet projects beyond said passageway in a direction transverse thereto; and a limiting member for folding the projecting end of said buffer sheet over the surface of said rigid sheet, said limiting means being provided in proximity to said transfer passageway at a position away from the intersecting point of said transfer passageway and vacuum-effecting and transferring surface in an advancing direction of said rigid sheet and opposite to said surface with respect to said passageway. Also for use in conjunction with said apparatus, there is provided an apparatus for transferring rigid sheets and adjacently interposed soft buffer sheets, stacking them and further transferring them, which comprises a passageway for continuous transfer of the rigid sheets and associated buffer sheets; a mechanism for separating the rigid sheets and buffer sheets placed therealong from said passageway; and a mechanism for receiving the associated rigid sheets and buffer sheets which have been dropped preferably in an oblique direction; registering and stacking them; and transferring a stack of these sheets when a predetermined number of the sheets have been stacked.

Other objects and advantages of the present invention will become more apparent from the following description to be given with reference to the accompanying drawings.

Figure 1:
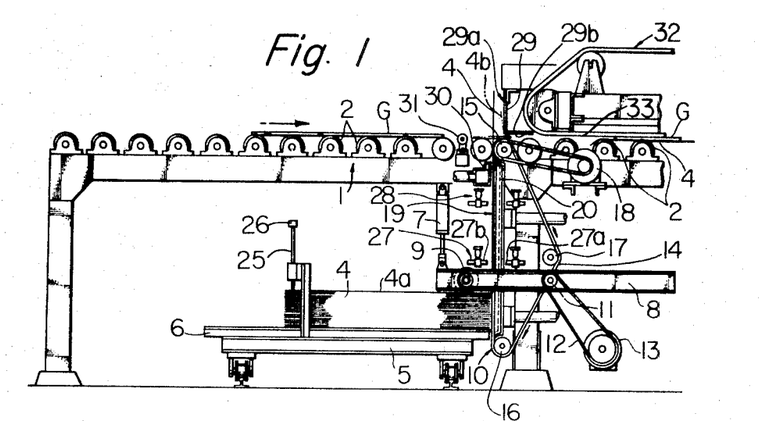
FIG. 1 is a side elevation, partly broken away, of the apparatus of the invention.
Figure 2:
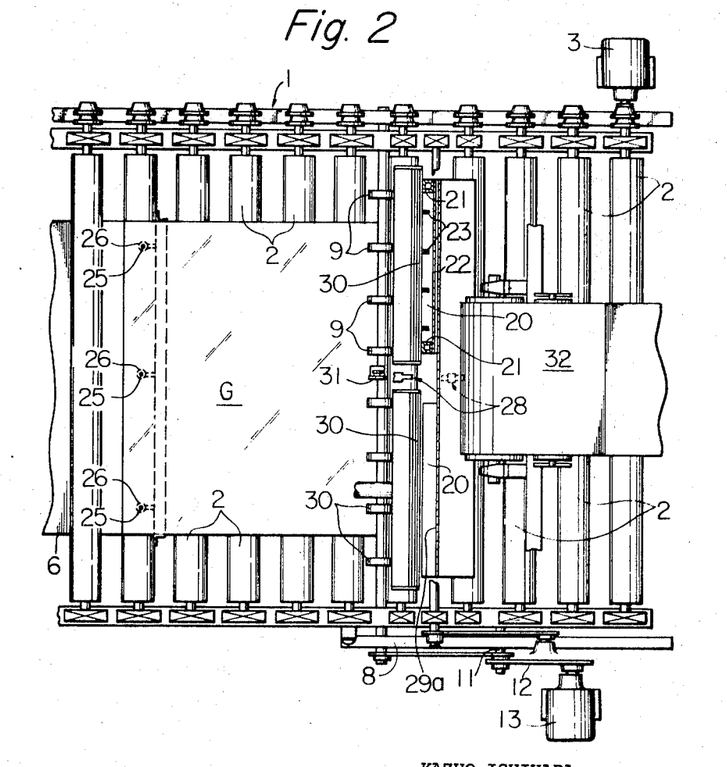
FIG. 2 is a plan view partially in cross section of the apparatus of the invention.
Figure 3:
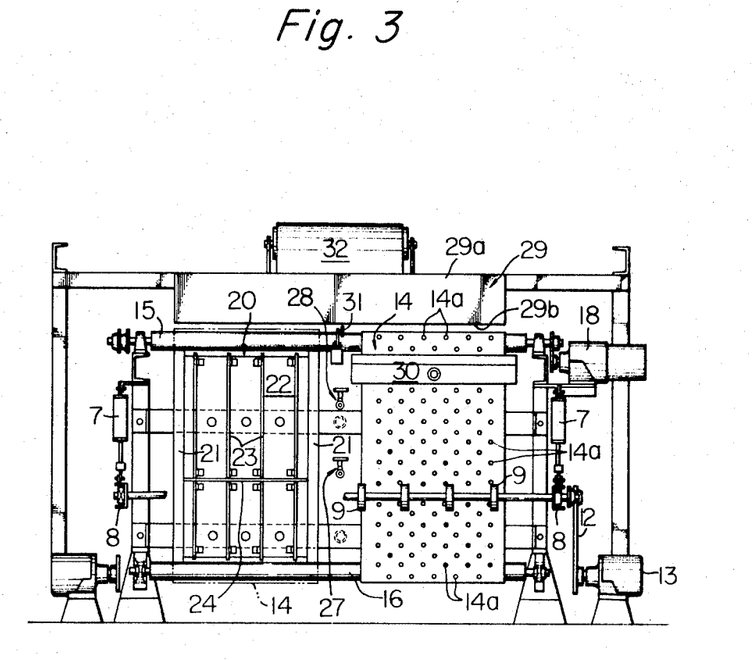
FIG. 3 is a front elevation, partly broken away, of the apparatus of the invention.

With reference to FIGS. 1, 2 and 3, especially FIG. 1, a roller conveyor 1 has a plurality of rubber rolls 2 arranged horizontally at right angles to the moving direction of the conveyor, which rubber rolls 2 are rotated at a predetermined speed by a motor 3 with a reduction gear. A stack of paper sheets 4 cut to a size slightly larger than that of a glass sheet G is placed on a pallet 6 of a truck 5 capable of creeping laterally beneath the roller conveyor 1. One end surface of the roughly horizontally stacked paper sheet 4 on the side of a paper-feeding suction conveyor 10 is in a parallel-spaced relationship with the vertical surface of an endless vacuum sheet-driving belt 14. At some distance opposite to said one end surface are provided several needles 25 which penetrate several sheets of paper 4 from the uppermost surface 4a of the stack of paper sheets 4. The needle device is a means for preventing two or more sheets from being fed simultaneously. These needles 25 are pushed by a suitable weight 26 or air cylinder so as to impart a relatively large pressure to the tips of the needles. When seen from above, the other two surfaces of paper 4 stacked on the pallet 6 protrude by approximately the same size from the two widthwise sides of glass sheet G being transferred by the roller conveyor 1.

A rotary-driven paper feed roll 9 mounted on a frame 8, capable of see-sawing by means of an air cylinder 7, is driven by a motor 13 through a transmission device 12 mounted on a pivot shaft 11 of the frame 8.

Sheets of paper are delivered in the same direction as the moving direction of the roller conveyor 1, by the paper-feeding roll 9, and then transferred by the suction conveyor 10 in an upward, perpendicular direction. The suction conveyor 10 consists of the endless belt 14 having a plurality of apertures 14a. The endless belt 14 rides on an upper roller 15, a lower roller 16 and a tension roller 17, and is moved by the roller 15 to be driven by a motor 18 with a brake. A suction or vacuum box 20 is disposed at the rear of an upward moving passage 19 between the rollers 15 and 16, and a vacuum is applied to the belt 14 at this portion 19. The suction box 20 consists of rectangular pipes on four sides and a steel bottom plate 22 with several exhaust ports (FIGS. 2 and 3). Nylon plates 23 for supporting the belt are disposed vertically in the suction box 20, and a nylon plate 24 is provided laterally in the suction box 20 to make the pressure of the box above the plate 24 differ from that of the box below said plate. This enables a vacuum force to be exerted on the belt 14 to overcome the weight of paper sheet 4 at the top portion of the upward moving passage 19, and also enables the belt 14 to acquire sufficient suction to quickly and positively attract the forward end of paper 4 delivered from the lower part of the passageway 19.

In delivering a sheet of paper 4, the frame 8 is pushed down about the pivot shaft 11 by means of an air cylinder 7 to thereby push down the roll 9 which is rotating at a constant speed and into contact the uppermost surface 4a of the stack of paper sheets 4. The roll 9 may be a rubber ring roll or brush roll. The use of a rubber ring roll makes it possible to increase the frictional force between this roll and paper 4 and to make the peripheral speed of this roll equal to the speed of the belt 14 and that of transferring glass sheet G. Where a brush roll is used, a coefficient of friction between the roll and paper is small and slippage occurs between them; it is preferable therefore to adjust the peripheral speed of this roll to two to three times that of the belt 14. The rubber ring roll is employed for paper of ordinary strength, and the brush roll is used for paper of a relatively low strength, in order to prevent breakage of the paper. Because of the presence of the needles 25, only one sheet of paper 4 at the uppermost surface is delivered at a time. The forward end of the delivered paper sheet 4 first abuts the upwardly moving belt 14 of the suction conveyor 10, and is then completely drawn by the vacuum surface of the belt 14.

The presence of the upward moving paper 4 is detected by a photoelectric switch 27 consisting of a beam projector 27a and a beam receiver 27b which is provided so as not to prevent the movement of paper 4 which rises while being held by the suction conveyor 10 (FIGS. 2 and 3). When paper 4 is present between the beam projector 27a and the beam receiver 27b of the photoelectric switch 27 and thus interrupts the light beam, the signal fro the switch will act to operate the air cylinder 7 and pull the paper feed roll 9, to thereby retract the roll 9 from the uppermost part 4a of the stack of paper sheets 4. Conversely, if the paper is absent there, the signal will act to operate the air cylinder 7 and push down the roll 9, to thereby deliver one sheet of paper 4 at the uppermost surface 4a in the manner described above. Located above the photoelectric switch 27 is a photoelectric switch 28 which is a detector adapted to position and stop the oncoming paper sheet 4. When the paper 4 being raised by the suction conveyor 10 cuts off the light from the beam projector of the photoelectric switch 28, the signal controls the motor 18 with a brake so that the conveyor 10 is driven for a predetermined period of time sufficient to project the forward end of the paper sheet 4 by a desired length above the upper surfaces of the rollers of the roller conveyor 1 which is used to transport the glass sheet G, and then said conveyor 10 is stopped. For providing these two photoelectric switches 27 and 28, the suction conveyor 10 consists of two sets of the combined suction box 20 and belt 14, each set being spaced from the other in a lateral direction. The said photoelectric switches 27 and 28 are interposed between these sets. The rollers 15 and 16 may be used simultaneously by these two sets that constitute the suction conveyor 10.

It is desirable that a surface of the belt 14 which comes in contact with paper 4 should be rough, thus providing a large coefficient of friction between the belt and the paper. A surface of the suction box 20 which comes into contact with the belt 14 should desirably have a small coefficient of friction with the belt 14. For providing a good seal between the four sides of the suction box 20 and the belt 14, the belt 14 ought to have a suitable pliability. The convexities and concavities of the belt surface resulting from the pliability, together with the space between the above-mentioned two sets of the suction box and belt where the photoelectric switches 27 and 28 are disposed, serve to render the surface of the paper 4 to be concave and convex, thereby providing a suitable strength even to paper having a low strength. The strength of the paper 4 will become effective when the forward end of the paper projects above the roller conveyor 1 and is maintained in stoppage.

Since, however, the forward end of the paper 4 projecting above the roller conveyor 1 is no longer suction held by the belt 14, it tends to become unstable in an upright position. For overcoming this difficulty, it is possible, for instance, to provide and upright support member 29 above the roller conveyor 1 and a nozzle 30 below it for blowing out compressed air, whereby that portion of the paper 4 which protrudes above the roller conveyor 1 is maintained along a perpendicular surface 29a of the limiting member 29.

Description will now be directed to the combination of glass sheet G being transferred on the roller conveyor 1 having an associated paper sheet 4, a greater part of which is vacuum held by the stopping suction conveyor 10, and a forward end of which projects above the roller conveyor 1.

A limit switch (with a free roller) 31 is provided on the passageway for transfer of glass sheet G at a position spaced apart from the feed suction conveyor 10 in a direction towards the oncoming of the glass sheet. When the oncoming glass sheet G pushes down this limit switch 31, the signal from it initiates the movement of the suction conveyor 10, and then raises the upright paper 4 suctioned to the belt 14. The forward end of the glass sheet G then catches the upper end of the paper 4 projecting above the roller conveyor 1, whereby the upper end of the paper 4 is folded over one surface of the glass sheet G. The glass sheet G and the paper sheet 4 placed therealong pass between the surface 29b of the limiting member 29 and the upper surfaces of the rubber rolls 2. To positively effect the folding portion 4b of the paper 4, a gap between the surface 29b of the limiting member 29 and the upper surface of the rolls 2 may be narrowed to the limited extent. If the surface 29b of the limiting member 29 is made of a straight brush so that the brush contacts the upper surface of the glass sheet G, the portion 4b of the paper 4 is completely folding of over the upper surface of the glass sheet G. If the paper feed rate of the suction conveyor 10 is made equal to the glass sheet transferring rate of the roller conveyor 1, a good combination of the glass sheet G and the paper 4 will be achieved without causing a relative movement between them.

When the combination of the glass sheet G and the paper 4 is accomplished in the above-mentioned manner, no paper is present at the photoelectric switch 27. The photoelectric switch 27 then acts on the air cylinder 7 to push down the paper feed roll 9, whereby, as described hereinabove, a sheet of paper 4 is delivered. This paper sheet 4 is positioned so that its upper end projects above the roller conveyor 1 to await the next glass sheet.

A suction conveyor 32 may be made to approach the upper surfaces of the rubber rolls 2 as shown in FIG. 1, whereby the glass sheet G and the paper 4 placed therealong can be transferred by the suction conveyor 32 while maintaining the portion 4b of the paper 4 in the folded-over state. Alternative or in addition to the suction conveyor, other conveyors such as a roller conveyor and a belt conveyor may be used.

When a certain sheet of glass G need not be combined with paper 4, the number of the glass sheets G is counted, for instance, by a limit switch (not shown) located immediately before a limit switch 43 so that feeding of a paper sheet 4 to that glass sheet is stopped.

The electrical system of the apparatus of the invention will be described with reference to FIGS. 4, 5 and 6.

Figure 4:
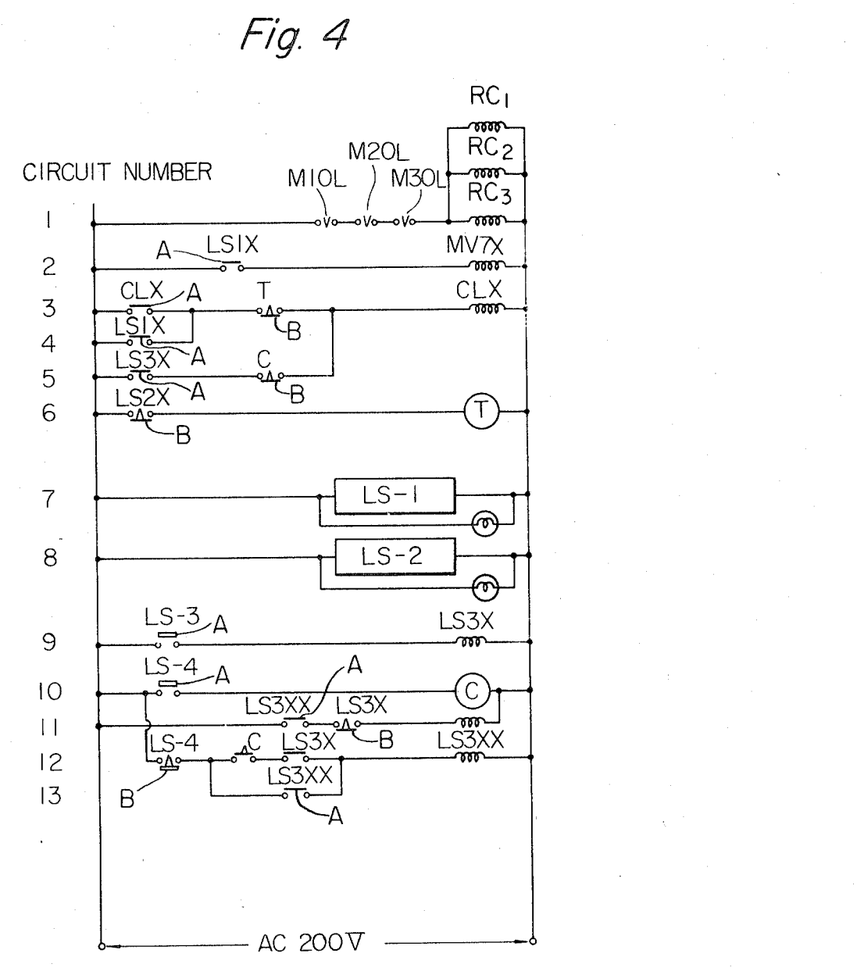
FIG. 4 is an electrical circuit of the apparatus of the invention.
Figure 5:
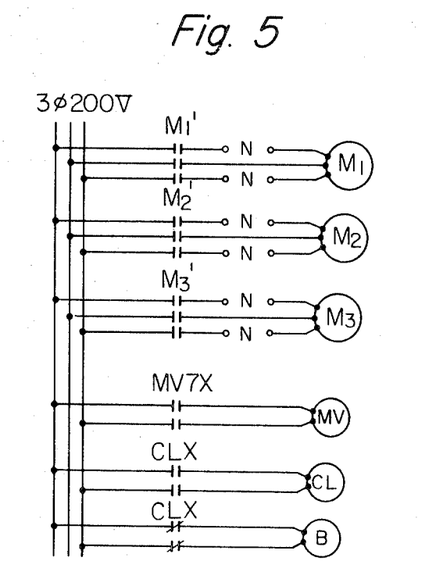
FIG. 5 is a circuit of motors $M_1$, $M_2$, and $M_3$, an electromagnetic valve for compressed air to be introduced into a cylinder 7, and a brake and a clutch for power transmission of motor $M_1$ to drive a vacuum belt.

In FIG. 4, M1OL, M2OL and M3OL in the first circuit are overcurrent relays, and they respectively constitute safety devices for overload on motors $M_1$, $M_2$ and $M_3$ in FIG. 5 and correspond to --o No-- in FIG. 5. In FIG. 4, the $RC_1$, $RC_2$ and $RC_3$ in the first circuit are respectively relay coils of relays $M_1'$, $M_2'$ and $M_3'$ of motors $M_1$, $M_2$ and $M_3$. The circuits operate in the following manner.

1. When paper 4 is not present on the suction belt 14, contact A of the photoelectric switch unit LS-1 (photoelectric switch 27) in the seventh circuit and contact A for the auxiliary relay LS1X (in circuit 4) of electromagnetic valve are closed and MV7X (relay for descending of the cylinder 7) in the second circuit is excited, and MV7X and MV electromagnetic valve in FIG. 5 are also opened, whereby compressed air is introduced to the cylinder 7 and the motor 13 is driven. The roll 9 is then urged against the upper surface 4a of the paper 4, and one sheet of paper 4 is delivered to the suction conveyor 10.

2. At this time, contact A for LS1X in the fourth circuit and contact B for the timer T in the third circuit are closed, the auxiliary relay CLX of the clutch is excited, CLX in FIG. 5 is closed, the clutch CL is engaged, and thus, the suction belt 14 is rotated. Contact A in the third circuit is closed.

3. Since, contact A of CLX in the third circuit is closed, even if paper 4 is raised by the suction belt 14 and cuts off the light of the beam projector to open the photoelectric switch unit LS-1 and contact A of the LS1X of the fourth circuit, the suction belt 14 is rotated and the paper 4 continues to rise, the auxiliary relay CLX of the clutch in the third circuit being excited.

4. Paper 4 is raised by the suction belt 14 to cut off LS-1 of the seventh circuit, render contact A of LS1X of the second circuit to be open and deactivate the excitation of MV7X of the second circuit, whereby the roll 9 departs from the upper surface 4a of the paper 4a.

5. The paper 4 is raised further by the suction belt 14 to cut off the light of the beam projector 28a of the eighth circuit and open the photoelectric switch (28) unit LS-2. Then, contact B for LS2X of the sixth circuit is closed to actuate timer T in the sixth circuit, whereby contact B of T in the third circuit, is opened after a predetermined time. Since contact A for LS3X of the fifth circuit is open at this time (glass G not coming), the excitation of the auxiliary relay CLX of the clutch in third circuit is stopped to thereby actuate brake B in FIG. 5 and halt the paper 4 at a predetermined position.

6. In FIG. 1, when glass sheet G pushes a limit switch (not shown in FIG. 1, but is of the same type as the limit switch 31) provided on that side of the limit switch 31 from which glass sheet G is transferred, to thereby close LS-4 in the 10th circuit in FIG. 4, the counter operates and counts the number of glass sheets G.

7. When in FIG. 1 the glass sheet G pushes down a limit switch 31 to close LS-3 in the ninth circuit in FIG. 4, the limit switch auxiliary relay LS3X in the ninth circuit is excited to close contact A of LS3X in the fifth circuit and then contact B of counter C in the fifth circuit. At this time, the auxiliary relay CLX of the clutch is excited to actuate the clutch CL in FIG. 5, and the suction conveyor 10 is again driven.

8. By the action of the suction conveyor 10, the glass sheet G and the paper 4 placed therealong are together transferred.

9. When the rearward or lower end of paper 4 passes the photoelectric switch 27 in FIG. 1, LS1X in the second circuit in FIG. 4 is closed. Thus, the electromagnetic valve auxiliary relay MV7X operates, and the electromagnetic valve in FIG. 5 is actuated. Thereafter, in the manner mentioned in paragraph 1 above, the second paper sheet 4 is delivered to the suction conveyor 10.

10. At this time, the suction conveyor 10 is driven by the closure of the fifth circuit (contact B for T is closed because counter C does not indicate the predetermined number of glass sheets). The position of the photoelectric switch 28 in FIG. 1 is adjusted so that paper 4 passes the photoelectric switch 28 before the glass sheet G departs from the limit switch 31. Thus, the suction conveyor is being driven.

11. Thereafter, in the manner as explained in paragraphs 4, 5, 6, 7, 8, 9 and 10 above, the second paper 4 leaves the apparatus of the present invention while being placed along the second glass sheet G.

Figure 6:
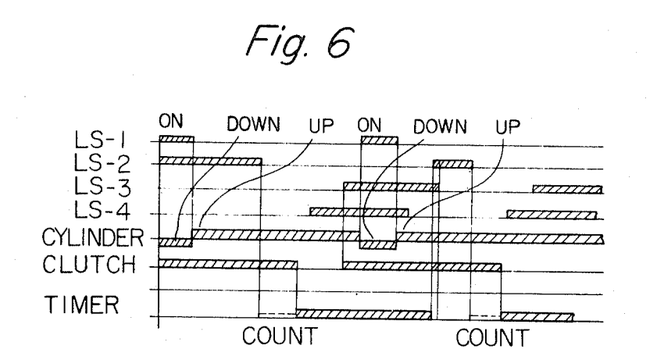
FIG. 6 shows a time schedule of the relays shown in FIG. 4.

The time schedule of the operations of LS-1 (photoelectric switch 27), LS-2 (photoelectric switch 28), LS-3 (limit switch 31), LS-4, cylinder 7, the clutch for motor 18, and timer T in FIG. 4 is given in FIG. 6. The counter circuit will now be described.

1. The glass sheet G closes LS-4 of the 10th circuit a predetermined number of times. Then, counter C in the 12th circuit is closed, and contact B for counter C in the fifth circuit is opened. Thus, even when contact A for LS3X of the fifth circuit is closed, the auxiliary relay CLX of the clutch in the third circuit is not excited, and the suction conveyor 10 is not driven. Consequently, only glass sheet G is transferred.

2. The glass sheet G further advances to close contact A for LS3X in the 12th circuit.

3. When the glass sheet G opens contact A for LS-4 in the 10th circuit, contact B for LS-4 in the 12th circuit is closed, whereby the relay coil LS3XX in the 12th circuit is excited and contact A for LS3XX is closed. Even when contact A for LS3X is opened by the glass sheet G, relay coil LS3XX is excited.

4. When contact A for LS3XX in the 11th circuit is closed and contact B for LS3X is opened by the glass sheet G (that is, when the glass sheet G has departed from the limit switch 31), current flows in the reset coil in the 11th circuit to thereby reset the counter.

Figure 7:
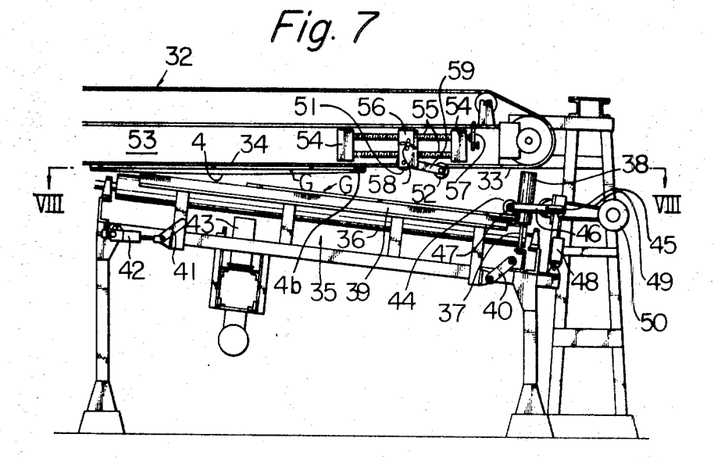
FIG. 7 is a side elevation of a sheet stacker.
Figure 8:
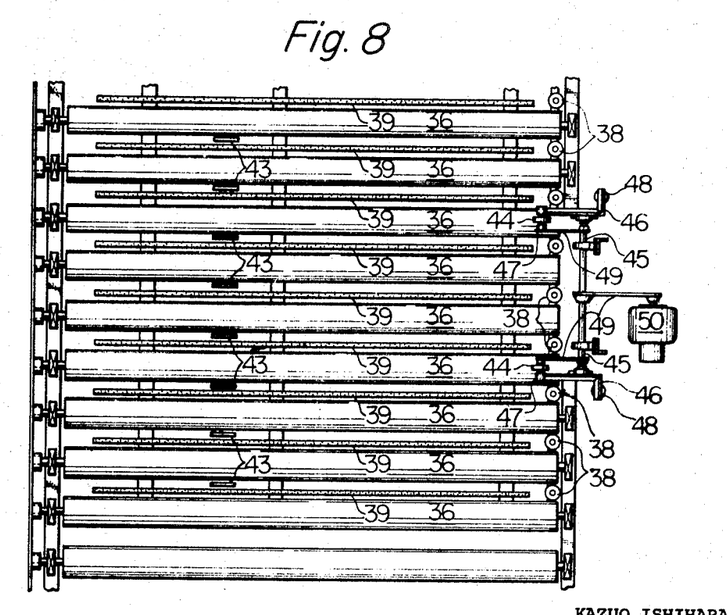
FIG. 8 is a top plan of the apparatus taken along the line VIII—VIII of in FIG. 7.

With reference to FIGS. 7 and 8, an apparatus for transferring combinations of the glass sheets G and paper sheets 4 placed therealong in the manner hereinabove described, and then stacking them will be described in detail.

When the glass sheet G is transferred by the suction conveyor 32, the paper sheet 4 is transferred together with the glass sheet G while the folded-over portion 4b of the paper is held between the lower side passageway 34 of an endless belt 33 and the forward end of the glass sheet G vacuum-held by it. The roller conveyor 35 is lower in position on the side facing the direction of the movement of the suction conveyor 32 which applies a suction to the glass at the lower side and transports it, than on the opposite side. Between those ends of two adjacent rubber rolls 36 of the roller conveyor 35 which are on the inclined side is located a positioning roller 38 pivoted about a rotary shaft 37 provided vertically of the upper surface of the roller conveyor 35. A plurality of straight brushes 39 for receiving the glass sheet G dropping from the suction conveyor 32 are located between the rubber rolls. Each of the straight brushes 39 is pivoted to the idle ends of parallel swing links 40 and 41, and is adapted to move up and down in parallel relationship. Thus, its upper end may be brought above the upper surface of the roller conveyor 35, and also below it. The idle end of the swing link 41 is connected to the piston of an air cylinder 42, whereby the air cylinder 42 is operated to raise and fall all of the brushes 39 simultaneously. An air-blowing nozzle 43 is provided to further alleviate the impact of the glass G dropping on the brushes 39. For urging the dropped glass sheets G and paper sheets 4 against the positioning rollers 38, a plurality o drive rollers 44 are each pivotally secured to horizontal shafts 47 of arms 46 capable of swinging up and down about horizontal shafts 45. The arms 46 are moved by an air cylinder 48. The rollers 44 are interlocked with a motor 50 via a transmission devices 49 mounted on the horizontal shafts 45.

While the glass sheet G and the folded-over portion 4b of the paper 4 are being suction-held by a perforated endless belt 33 of the suction conveyor 32, the glass sheet G and the paper 4 move along the passageway 34 on the underside. The associated glass sheet G and the folded sheet portion 4b of the paper 4 are detached from the suction belt 33 by a detaching means consisting of two sets of a pair of rollers 51 and 52 disposed on both sides of the suction conveyor 32. The roller 52 projects from the surface of the suction belt 33 by a length larger than the roller 51. The glass sheet G first contacts the roller 51 and then the roller 52, and is detached from the suction belt.

Prior to the receiving of the first glass sheet G, the air cylinder 42 is operated to project the brushes 39 above the upper surfaces of the rubber rolls 36 so as to form a brush mat, and at the same time, air is blown from the nozzle 43. By so doing, the first glass sheet G rides on the brush mat without undergoing impact shock. Then, the air cylinder 48 is actuated to lower the arms 46, thereby urging the rotating roller 44 against the upper surface of the end of the glass sheet G on the inclined lower side. Thus, the glass sheet G is assuredly brought into contact with the positioning roller 38. When the glass sheet is positioned as mentioned above and thus becomes stable, the air cylinder 42 is actuated to let the brushes down, and transfer the glass sheet G onto the stationary rubber rollers. Then, the air cylinder 48 is actuated to move the drive rollers 44 upwards. The glass sheet G and the paper 4, which have been then detached from the suction belt 33 by means of the rollers 51 and 52, are gently lowered in a stable condition onto the glass sheet G previously presented on the rollers 36. A shock-free transfer is effected by the presence of the paper 4 and a pneumatic film formed between the glass sheet G and the paper 4. The air cylinder 48 is then actuated to cause the drive rollers 44 to contact the glass sheet G. Thus, the glass sheet G and the associated paper 4 are brought into abutment with the roller 38, and are stabilized at a predetermined position.

A predetermined number of the glass sheets G and paper sheets 4 which have thus been stacked on the roller conveyor 35 are transferred to a packing place while one edge portion of the stack is maintained in contact with the positioning rollers 38.

The perforated endless belt 33 is driven by a motor (not shown), and its lower side providing a transfer passageway 34 has imparted thereto a suction force by means of a suction box 53. The rollers 51 and 52 are supported by a member 56 capable of moving in parallel relationship with the endless belt 33 by the rotation of two interlocking screw shafts 55 pivotally supported on bearing 54. The positions of the rollers 51 and 52 can be changed by the operation of the handle 57. The roller 52 is pivotally supported by an arm 59 which is pivotally secured to a movable member 56 and is capable of changing its inclined angle up and down by a fixed position adjusting means 58. Thus, the downward projecting length of the roller 52 can be varied.

While the description of the invention has so far been directed to a glass sheet and paper as one example of the rigid sheet and the buffer sheet respectively, it is to be understood that the invention is also applicable to other rigid sheets such as synthetic resin sheets and metal sheets and other buffer sheets such as synthetic resin films, fabrics and nonwoven fabrics, and that various transferring devices may be interposed between the apparatus for placing buffer sheets along rigid sheets and the stacker for combinations of these sheets.

What we claim is:

1. A method of applying a flexible protective buffer sheet along at least one surface of a moving rigid sheetlike object, of stacking said objects and then transferring stacks of said objects, which comprises the steps of:
   1. conveying said object in a generally horizontal direction along a passageway for conveying said objects;
   2. positioning a protective buffer sheet transversely to said passageway so that one end of said buffer sheet projects across and extends at least slightly beyond the plane of travel of said objects therein;
   3. continuing moving said rigid sheet along said passageway to engage the projecting portion of said buffer sheet, and thereby effecting folding over said buffer sheet slightly over the upper surface and fully over the lower surface of said rigid sheet commencing at the part contacted by the approaching or lead end of said object;
   4. applying a vacuum suction force from above for withdrawing as a unitary assembly said rigid sheet and said adjacently associated buffer sheet fully underlying said lower surface thereof;
   5. continuing the general horizontal conveying of said unitary assembly along said passageway while maintaining the vacuum suction force assembly thereof;
   6. dropping them from the conveying passageway to a transfer passageway oriented to move stacks of said objects in a direction transverse to said conveying passageway;
   7. receiving and vertically registering successively the assembly of dropped sheetlike objects with buffer sheets to form a stack having a predetermined number therein; and
   8. subsequently transferring said stack of protectively buffered sheetlike objects along said transfer passageway when said predetermined number of said assembly of objects has been stacked.

2. A method as defined in claim 1 wherein the step of paragraph (2) includes applying a vacuum to hold said sheet against a vertically moving conveying means to effect the said positioning thereof.

3. Apparatus for placing a flexible protective buffer sheet along at least one surface of a moving rigid sheetlike object having upper and lower surfaces, which comprises means defining a conveying passageway for successively conveying a plurality of said objects continuously in a generally horizontal direction; station means adjacent said passageway for keeping a supply stack of said buffer sheets: means located adjacent said conveying passageway and said station having a surface provided generally vertically adjacent said conveying passageway and means for applying vacuum suction thereto and means for generally vertically transferring said buffer sheets along said surface; a feed device for feeding said buffer sheets one by one from said station means to the vacuum suction vertical transferring surface; vertical travel-limiting means operatively connected with said vertical transferring means for stopping the latter at predetermined times for positioning each buffer sheet so that an upper end portion thereof projects slightly above the plane of said objects carried on said horizontally conveying passageway and said buffer sheet positioned transversely to said conveyed object; means for maintaining said end portion of said buffer sheet, which projects above the plane of said conveyor carried objects in a substantially upright condition to properly orient it pending engagement thereof by a leading edge of a conveyed object; and means adjacent said passageway for engagement by and folding over of the projecting upper end portion of said buffer sheet partially over the upper surface and fully along the lower surface of said sheetlike object responsive to continuing conveyance of said sheetlike object along said conveying passageway.

4. Apparatus as defined in claim 3 wherein said feed device for feeding the buffer sheets one by one includes means supporting a stack of buffer sheets beneath said horizontal conveying passageway means with one end of said sheets adjacent said vertical transferring surface to which the vacuum suction is applied; a needle device disposed at the opposite end of said stack of buffer sheets and having needles for penetrating from above several of the stacked buffer sheets to help hold and orient same during the feeding thereof; a rotary feed roll at the end of said sheets adjacent the vertical transferring surface, which roll has means connected therewith for imparting selectively timed engagement of the feed roll with said buffer sheets for feeding the buffer sheets one by one to the vertical transferring surface; and said means for effecting vertical transfer on said surface include an endless belt.

5. Apparatus as defined in claim 4 further including vacuum suction means disposed adjacently above and in cooperation with said horizontal passageway means beyond the intersection thereof with said vertical transfer surface, for vacuum holding and helping to convey said object primarily by its upper surface, as assembled with the associated underlying protective buffer sheet, further along the horizontal conveying passageway to a predetermined release point therealong.

6. Apparatus as defined in claim 3 further including vacuum suction means disposed adjacently above and in cooperation with said horizontal passageway means beyond the intersection thereof with said vertical transfer surface for vacuum holding and helping conveying said object primarily by its upper surface, as assembled with the associated underlying protective buffer sheet, further along the horizontal conveying passageway to a predetermined release point therealong.

7. Apparatus as defined in claim 6 further including an elongated extension of said horizontal conveying passageway for continuous passage of the assembled protectively buffered sheetlike objects to the predetermined release point; means for releasing the vacuum suction holding force on the upper surface of said objects; a receiving device having an inclined supporting means below said horizontal passage and means for protectively receiving in progressive succession the associated objects and buffer sheets as they are releasably dropped in a downwardly direction; means associated with said inclined supporting means for registering and stacking a predetermined number of successive assembled objects; and conveying means in combination with said inclined supporting means for transferring a stack of these sheets when a predetermined number of the sheets have been stacked.

8. Apparatus as defined in claim 7 further including the means defining the vertical transferring surface for guiding and transferring the buffer sheets, and the means for applying a suction force to hold said buffer sheets thereagainst during the vertical travel thereof, cooperatively including means for applying vacuum suction forces of differing pressures at upper and lower portions thereof, thereby facilitating application of a pressure in the upper portion sufficient to overcome the weight of the buffer sheet, and to further more quickly and positively facilitate a vacuum suction of the lead end of said sheets during their feeding toward and onto said vertical conveying surface.

9. Apparatus as defined in claim 7 wherein the means for protectively receiving the sheetlike objects on the inclined support means of the receiving device include a plurality of mechanically actuated cushioning support members with pneumatically activated link means connected therewith for alternately selectively raising said support members simultaneously in coplanar relation above the plane of the said conveying means in combination therewith, to receive the suction-carried objects after their release at said release point, and for subsequently lowering said objects in cooperation with said means for registering and stacking said objects upon said inclined support means.

10. Apparatus as defined in claim 9 further including means for generating a pneumatic air cushion in association with said cushioning support members to supplementally cushion the released sheetlike objects during their downward movement onto said support means.

11. Apparatus as defined in claim 3 wherein the means defining the vertical transferring surface for guiding and transferring the buffer sheets, and the means for applying a suction force to hold said buffer sheets thereagainst during the vertical travel thereof, cooperatively include means for applying vacuum suction forces of differing pressures at upper and lower portions thereof, thereby facilitating application of a pressure in the upper portion sufficient to overcome the weight of the buffer sheet, and to further more quickly and positively facilitate a vacuum suction of the lead end of said sheets during their feeding toward and onto said vertical conveying surface.

12. Apparatus as defined in claim 3 wherein said means for maintaining said end of said buffer sheet which projects above the plane of said conveyor-carried objects in the substantially upright condition, includes a generally upright support and a nozzle opposed thereto for jetting a pressurized fluid against said upwardly projecting portion of said buffer sheet as interposed between said nozzle and said upright support.

* * * * *